June 9, 1931. F. PAHLOW 1,808,933
VEGETABLE CUTTER
Original Filed May 3 1928
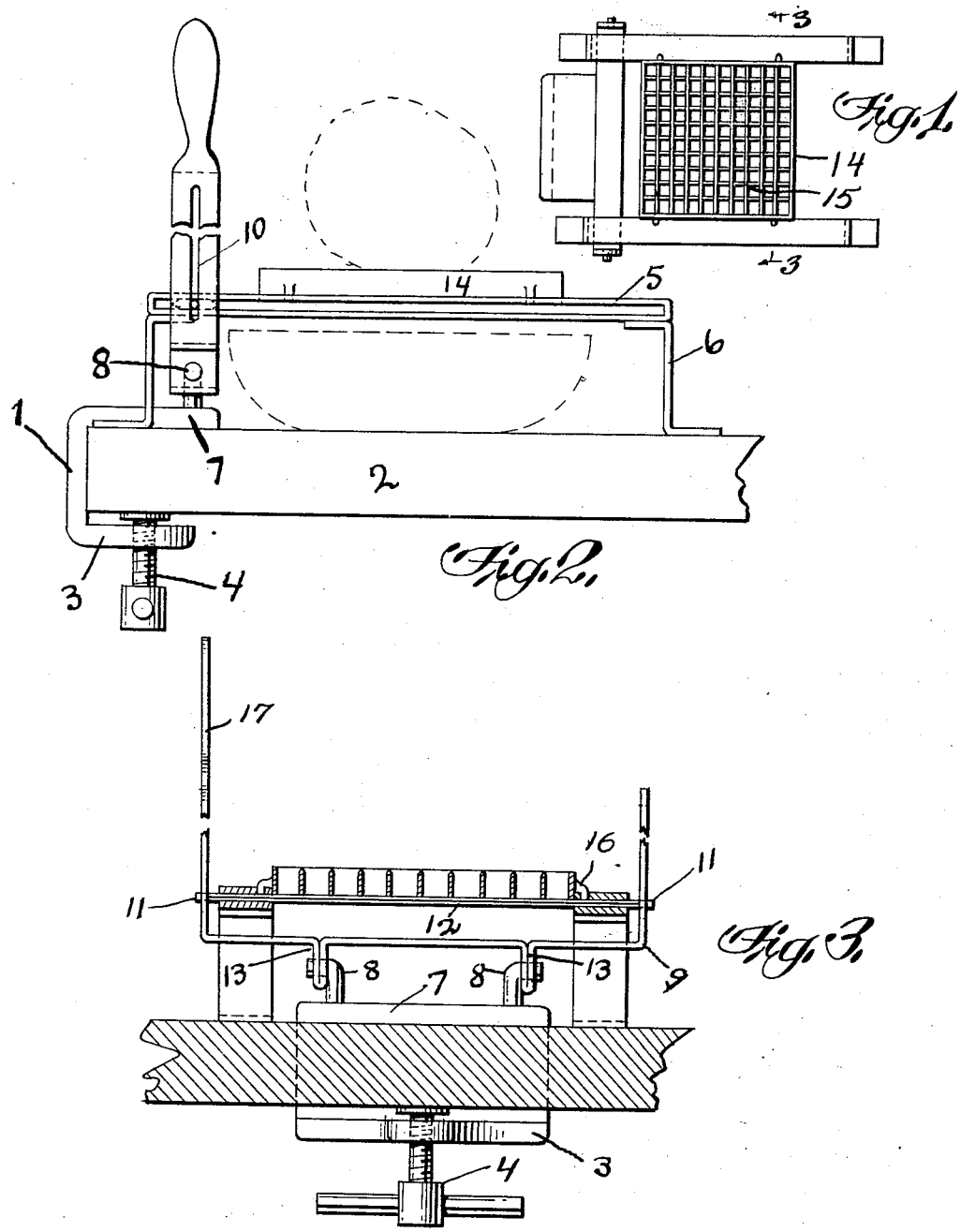
Fritz Pahlow
INVENTOR
ATTORNEY Patented June 9, 1931

1,808,933

UNITED STATES PATENT OFFICE

FRITZ PAHLOW, OF CHICAGO, ILLINOIS

VEGETABLE CUTTER

Application filed May 3, 1928, Serial No. 274,948. Renewed December 8, 1930.

This invention relates to new and useful improvements in vegetable cutters and more particularly to a device which is especially adapted for use in slicing onions, potatoes and similar vegetables. One of the objects of my invention is the provision of a vegetable cutter or slicer which can be conveniently used for cutting up onions, potatoes and other similar vegetables where it is to advantage to have the vegetables cut in small pieces, as in the making of soups and similar dishes.

Another object of my invention is the provision of a device of the above character so constructed that vegetables can be quickly cut into small pieces for various uses and the machine can be quickly operated to cut up a great quantity of vegetables in a minimum length of time.

With the above and other objects in view, the invention consists in the novel features of construction, the combination and arrangement of parts hereinafter more fully set forth, pointed out in the claims and shown in the accompanying drawings, in which Figure 1 is a top plan view of a device constructed in accordance with my invention, Figure 2 is a side elevation, and Figure 3 is a cross section on the line 3—3 of Figure 1.

In the construction of my device I provide a clamping member 1 comprising upper and lower plates adapted to be arranged upon opposite sides of a platform or other support 2, the lower plate 3 carrying a clamping screw 4 for engagement with the support to hold the clamp against movement.

Arranged upon the support 2 in spaced parallel relation are the guide loops 5 which extend parallel with the clamp and are supported at their ends by means of the Z-shaped standards 6, the lower ends of which are rigidly secured to the support 2.

Extending upwardly from the upper clamping plate 7 and arranged in spaced relation are the angular bearing posts 8 for pivotally supporting the U-shaped frame 9. The ends of the frame 9 extend upwardly outside of the loops 5 and project considerably above the loops, as shown in Figure 2. These projecting ends are formed with longitudinal slots 10 for receiving the pinions 11 on the ends of the movable cutting blade 12.

The intermediate portion of the frame 9 is formed with spaced perforated wings 13 that are pivotally mounted on the horizontal portions of the angular bearing posts 8, so that the ends of the frame may move in the arc of a circle and cause the cutting blade 12 to be reciprocated in the loops 5.

Supported upon the loop members 5 is a substantially rectangular frame 14 in which are arranged a plurality of cutting blades 15, certain of the blades extending in parallel relation one way of the frame and the remaining blades extending in parallel relation the other way and crossing the first blades to form a plurality of rectangular openings. This frame is supported directly above the path of the blade 12 and is formed with hook portions 16 upon opposite sides thereof for engagement with suitable openings in the loops 5, as shown in Figure 3.

In operating the device one of the upwardly extending ends of the frame 9 is formed with a handle part 17 which is grasped by the operator for moving the ends of the frame toward and away from the support 2, so as to reciprocate the cutting blade 12 beneath the frame 14. Before the blade 12 is moved beneath the frame a vegetable is placed on the cutting blades 15 and pressed downwardly, cutting the vegetable in small squares, and these small squares are sliced off through the reciprocatory movement of the blade 12.

It will be apparent from the foregoing that I have provided a simple and inexpensive vegetable cutter wherein different types of vegetables may be quickly and readily cut into small pieces for cooking or other purposes and the device is so constructed and the parts so arranged that it may be quickly and easily cleaned, so as to maintain the same in a sanitary condition.

While I have shown and described the preferred form of my improved vegetable cutter, it will be apparent that various changes and alterations may be carried out without departing from the spirit of the invention or the scope of the appended claims.

I claim as my invention:

1. A device of the class described, including a support, cutting blades supported thereon, a reciprocating cutting blade movable beneath said first blades, a clamp on said support beneath said blades, angular bearing posts on the clamp, a U-shaped frame having perforated wings at its intermediate portion, pivoted on said posts, and the ends of said frame being slotted to receive the ends of the reciprocating blade.

2. A vegetable cutter including a support, spaced Z shaped supports thereon, guide loops mounted on said supports, vertical cutting blades carried by said guide loops, a reciprocating cutting blade movable beneath said first cutting blades, a clamp removably secured to the support, angular bearing posts on the clamp, a U-shaped frame having perforated wings at its intermediate portion and pivoted on said posts, the ends of said frame being slotted to receive the ends of the reciprocating blade, and a handle member on one end of said frame whereby said frame may be moved upon its pivot to move said latter blade beneath the first cutting blades.

In witness whereof, I have hereunto set my hand this 14th day of April, A. D. 1928.

FRITZ PAHLOW.